United States Patent [19]

Ruggieri et al.

[11] Patent Number: 4,756,002
[45] Date of Patent: Jul. 5, 1988

[54] LASER DIODE COUPLER

[75] Inventors: Neil F. Ruggieri; Jimmie D. Copple, both of St. Louis County; Gordon H. Burkhart, Bellefontaine Neighbors, all of Mo.

[73] Assignee: McDonnell Douglas Corporation, St. Louis, Mo.

[21] Appl. No.: 877,361

[22] Filed: Jun. 23, 1986

[51] Int. Cl.$^4$ ............................................. H01S 3/091
[52] U.S. Cl. ......................................... 372/70; 372/75; 372/34; 372/9; 372/72; 372/107
[58] Field of Search .................... 378/69, 70; 372/75, 372/72, 34, 9, 107

[56] References Cited

U.S. PATENT DOCUMENTS

| | | | |
|---|---|---|---|
| 3,222,615 | 12/1965 | Holly | 372/70 |
| 3,248,671 | 4/1966 | Dill et al. | 372/108 |
| 3,440,560 | 4/1969 | Pole | 372/66 |
| 3,533,013 | 10/1970 | Seitz | 372/66 |
| 3,634,777 | 1/1972 | Uchida | 372/72 |
| 3,663,893 | 5/1972 | Ostermayer, Jr. | 372/75 |
| 3,683,296 | 8/1972 | Scalise | 372/75 |
| 3,684,980 | 8/1972 | Kay | 372/75 |
| 3,821,663 | 6/1974 | Brenner | 372/75 |
| 4,553,238 | 11/1985 | Shaw et al. | 372/66 |

Primary Examiner—Leon Scott, Jr.
Attorney, Agent, or Firm—Rogers, Howell, Moore & Haferkamp

[57] ABSTRACT

A cylindrical laser rod has a cylindrical sleeve surrounding it, the cylindrical sleeve having a reflective coating applied to its periphery with one or more transparent flats or slits being positioned in an equiangular fashion about the sleeve. At each slit, a focus lens and a retro-reflecting lens is mounted thereto, with the focal lens being aligned in an off axis orientation such that a linear laser diode array can be aligned with the focus lens and its beam directed in a off axis path through the laser rod for reflection a plurality of times through the sleeve and rod, the beams being returned along its reflecting path by the retro-reflector to maximize the coupling between each linear laser diode array and the laser rod.

37 Claims, 5 Drawing Sheets

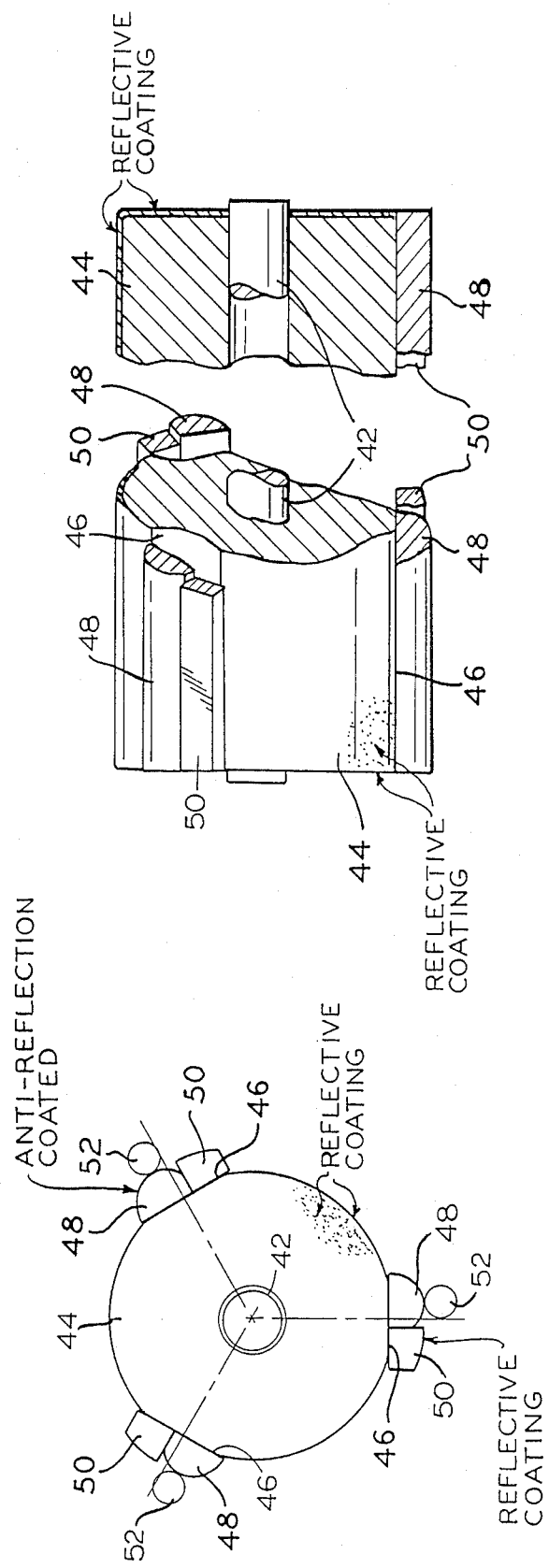

LASER DIODE COUPLER

BACKGROUND AND SUMMARY OF THE INVENTION

There are inherent problems with coupling a linear array of laser diodes with a solid state laser rod due to the geometry involved, and the properties of a typical Nd:Yag laser rod. Typically, a laser rod is side pumped by a linear array of laser diodes aligned in a straight line along the height dimension and oriented at the periphery thereof. As the laser diodes are energized, light enters through the side of the rod and the energy is absorbed by the atoms in the rod and excited or pumped to a higher energy level, thereby creating the lasing effect. Additional power output can be obtained from the rod by increasing the number of linear arrays mounted along the periphery thereof. However, these prior art arrangements have produced generally less than satisfactory results for several reasons.

One of the problems is that for smaller diameter rods, the optical thickness of the rod is minimized, thereby decreasing the absorption length or light path for the light emitted from the diodes. This results in only a small amount of pump energy being deposited within the lasing mode volume in the rod. A secondary effect caused by the poor rod absorption is the increased sensitivity to laser diode junction temperature and resulting wavelength mismatch experienced in the smaller diameter rods. Wavelength mismatch is the difference between the laser diode wavelength and the laser rod pump absorption bands. As the laser diode wavelength output varies with respect to temperature, performance can be seriously affected should the laser diode temperature not be carefully controlled to produce an output at the wavelength required to optimize absorption in the rod.

Several attempts have been made to improve the typical prior art arrangement to increase the coupling between the pump and the rod. One of these has been the addition of a sleeve over the rod, with a reflective coating being applied to the periphery of the sleeve except for a polished transparent flat or slit against which is mounted the linear laser diode array. In this configuration, laser diode light is directed through the sleeve, into the rod, through the center of the rod to the far periphery of the sleeve, and then reflected back through the center of the rod a second time. While this arrangement does offer some improvement, it still suffers from poor coupling efficiency in that nearly all of the pump energy is not concentrated in the laser rod nor in the laser mode volume within the rod. Furthermore, the only diode light that is reflected back through the rod must originate along a path through the center of the rod, and the optical design of this configuration does not permit most of the pump light to pass near the center of the laser rod.

To solve these and other problems in the prior art, the inventors herein have succeeded in developing a laser diode pump coupler which dramatically increases the efficiency of coupling between a linear array of laser diodes and a laser rod. The laser diode pump coupler of the present invention includes a cylindrical sleeve which slides over the laser rod, the sleeve having a reflective coating around its periphery with one or more transparent flats against which is positioned a pair of optical elements. The sleeve may either be hollow or solid, and if hollow, filled with transparent coolant fluid. If solid, the gap between the rod and sleeve is filled with an index matching compound, such as RTV.

The first of these two optical elements is a cylindrical focus lens for focusing the light being emitted by the linear array, and the second of these is a retro-reflector, the retro-reflector being mounted adjacent to the lens. Each lens focuses the laser diode beam from the linear array through the rod in an off-center alignment. By doing so, the beam impinges on the opposite wall of the cylindrical sleeve and bounces back through the laser rod in another off-center alignment to a point on the cylindrical sleeve's periphery spaced from its point of origin. As the sleeve is cylindrical, these reflections continue to traverse the rod in different paths. Thus, the beam continues to reflect back and forth through the laser rod thereby "walking" its way around the periphery of the sleeve.

Depending upon how many sets of focal lenses, retro-reflectors, and linear arrays are used, the beam will bounce through a corresponding angular sector of the sleeve and rod but eventually impinge upon a retro-reflector. The retro-reflector is designed to reverse the "walking" of the beam so that it substantially retraces its various paths through the laser rod until the pump light escapes through the focal lens at its point of origin. As can be appreciated, this pump coupler design has the advantage of theoretically multiplying the effective optical thickness (i.e. diameter) of the laser rod by 18–20 times to thereby concomitantly increase the pump light absorption length of the laser rod. Furthermore, because of the off-center focus, the pump coupler concentrates and focuses the pump energy within the laser mode within the laser rod resulting in maximum energy utilization between the laser mode and pump light. By increasing the effective optical thickness of the laser rod, the laser diode wavelength mismatch and temperature sensitivity is dramatically reduced, thereby providing a much wider range of wavelengths which can be selected for use as a laser pump, and also a wider range of temperatures over which the laser diodes may be operated with very small changes in laser output power.

Because of the very nature of the invention, the pump coupler design can be easily modified to increase the number of laser diodes either around the laser rod or along the laser rod by respectively adding more linear laser diode arrays or more diodes per array. In an alternative embodiment, offset reflective cylindrical elements may be utilized in place of the refractive cylindrical lens elements to collect and focus the laser diode light into the sleeve and through the laser rod. This provides flexibility and opportunities for design choice heretofore unavailable in the prior art. As their preferred embodiment, the inventors herein utilize three linear arrays with three associated sets of cylindrical focus lenses and cylindrical retro-reflector elements bonded to three flats located 120° apart on the cylindrical sleeve. With this arrangement, there are three sets of beams which are independently "walking" their way around the periphery of the sleeve and which impinge upon and energize different portions of the laser rod.

BRIEF DESCRIPTION OF THE DRAWINGS

FIG. 3 is a top view of a solid state laser rod with cylindrical sleeve and three sets of focus and retro-reflector lenses as utilized in the present invention;

FIG. 4 is a side view of the invention partially broken away to further detail the lenses, sleeve, and rod;

DETAILED DESCRIPTION OF THE PREFERRED EMBODIMENT

Figure 1:
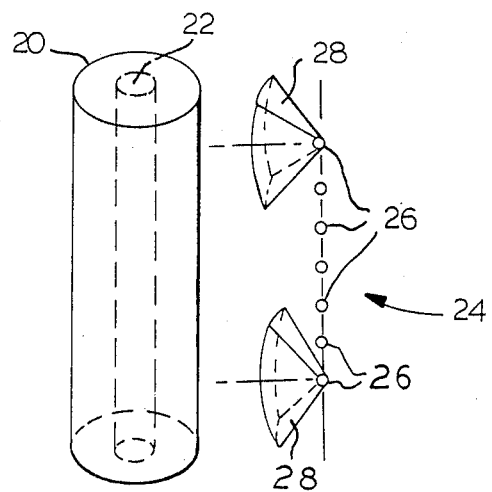
FIG. 1 is a representational view of the prior art with a solid state laser rod side pumped by a linear array of laser diodes.

As shown in FIG. 1, the prior art typically included a solid state laser rod 20, the rod having an area of principal lasing mode 22 therein which was side pumped by a linear laser diode array 24 comprised of a plurality of laser diodes 26. Each laser diode had a typical laser beam shown representationally as 28 in FIG. 1 with a beam elevation of approximately plus and minus 70° off-center and an azimuth of plus and minus 15°. Thus, a large portion of the energy from each diode 26 contained within the array 24 did not impinge upon the lasing mode 22, thereby resulting in minimal power output.

Figure 2:
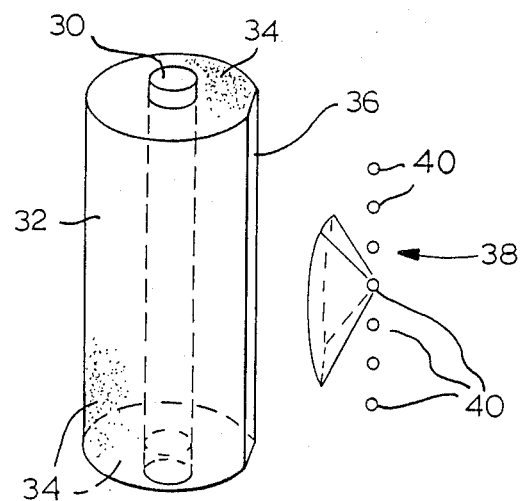
FIG. 2 is a representational view of a solid state laser rod with cylindrical sleeve side pumped with a linear array of laser diodes through its central axis.

A step towards improving the pump coupling is shown in FIG. 2 wherein a solid state laser rod 30 is surrounded by a cylindrical sleeve 32, sleeve 32 having a reflective coating 34 along its periphery and at both ends thereof to reflect light back through the cylindrical sleeve 32. A polished transparent slit or flat 36 is formed along the periphery of sleeve 32 and provides an access for the laser diode array 38. With the laser diode array 38 aligned with the center line of each of the laser diodes 40 through the central axis of the laser rod 30, most of the light impinging upon the solid state laser rod 30 traverses the rod at least twice, as a portion of it bounces back from the opposite sidewall of sleeve 32.

As shown in FIGS. 3 and 4, the present invention includes a solid state laser rod 42 surrounded by a cylindrical sleeve 44 with a reflective coating applied to its periphery and with three transparent slits or flats 46 positioned 120° apart around the periphery of the cylindrical sleeve 44. Sleeve 44 may be either hollow and filled with transparent liquid coolant, or solid. At each of these transparent flats 46 is mounted a cylindrical focus lens 48 and a cylindrical retro-reflector 50. As shown in the drawing, each of the focus lens 48 is off axis from a radius drawn from the center of the laser rod 42 to the focus lens 48. Each cylindrical focus lens 48 has an associated linear laser diode array 52 aligned therewith such that its beam is focused through an off axis portion of the laser rod 42. This is best shown in FIG. 5.

Figure 5:
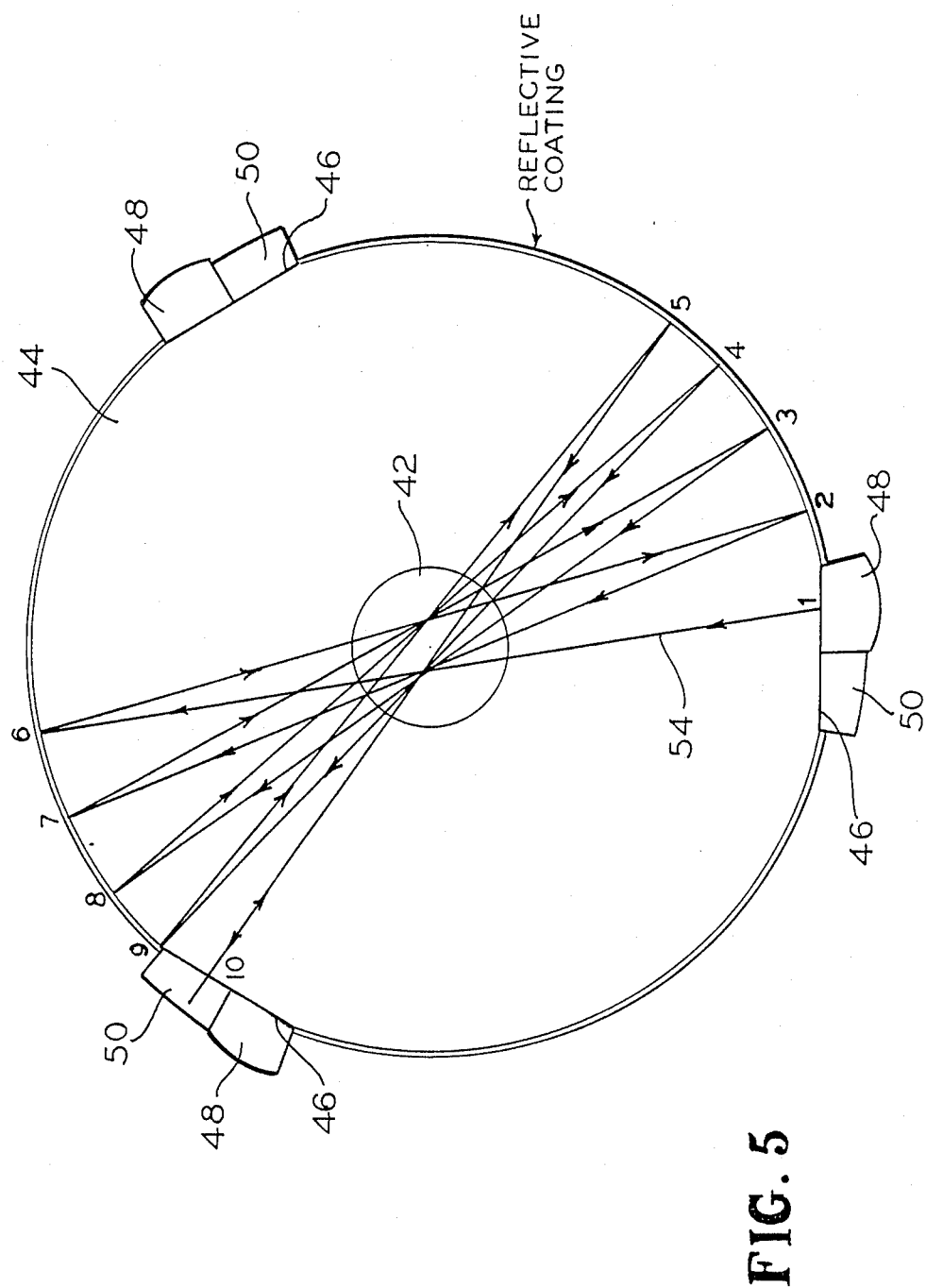
FIG. 5 is a top view of the invention with a central ray traced therethrough to depict the path thereof for one of the laser diode sources.

As shown in FIG. 5, the beam or central ray 54 is focused by focus lens 48 through the laser rod 42 in an off axis path. When it impinges upon the far periphery of the cylindrical sleeve 44, it is reflected back through a different path, again off axis, through laser rod 42 until it impinges upon the periphery of cylindrical sleeve 44 at a point spaced apart from the focus lens 48 but adjacent thereto. These last two points are labeled 6 and 2 in FIG. 5. The central ray 54 is then reflected in a similar manner to point 7 on the far peripheral wall of cylindrical sleeve 44, then back to point 3 adjacent focus lens 48, then to point 8, point 4, point 9, point 5, and then point 10 where the central ray impacts retro-flector 50. Retro-reflector 50 has a reflective coating applied thereto and is shaped such that it returns the central ray 54 back along its same path to return to its point of origin, or point 5. Because of the cylindrical shape of sleeve 44, central ray 54 will then reflect back along its original path where it will finally escape sleeve 44 through focus lens 48. Thus, the focus lens at the six o'clock position in FIG. 5 works in tandem with the retro-reflector at the ten o'clock position to bounce the energy from a single linear diode array such that it passes through the laser rod 42 a total of twenty times. This significantly improves the coupling between each linear diode array and the laser rod 42. While not described in detail, it should be understood that each of the other focus lenses 48 has an associated linear laser diode array and works in tandem with a retro-reflector to similarly bounce the energy therefrom along a similar path which traverses the laser rod 42 a total of twenty times. Although three sets of focal elements are shown in the preferred embodiment, it should be understood that a greater or lesser number may be used depending upon the desired operating characteristics, geometry chosen, and other parameters as is well known in the art to optimize the laser performance.

Figure 6:
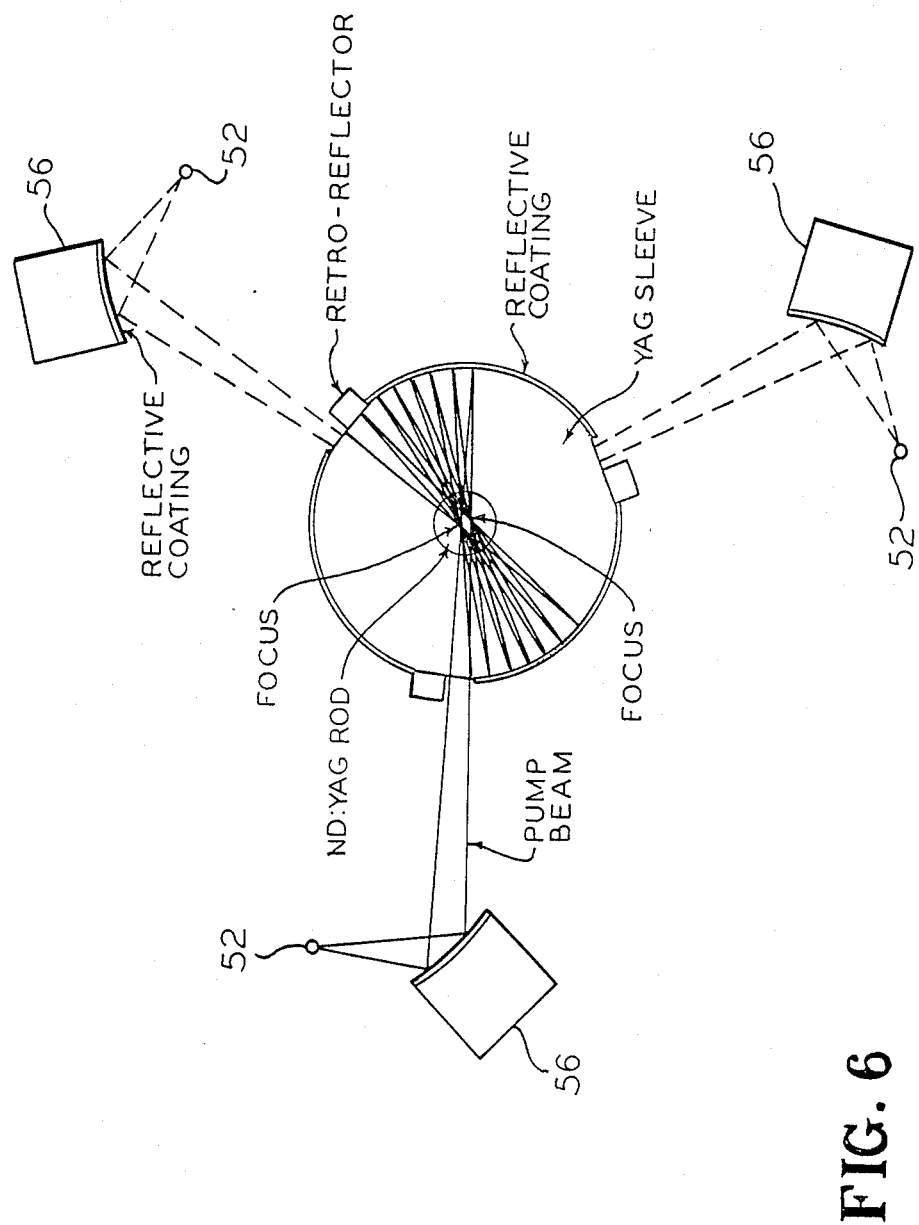
FIG. 6 is a cross-sectional view of an alternative embodiment utilizing offset cylindrical reflectors for the primary focal element.
Figure 7:
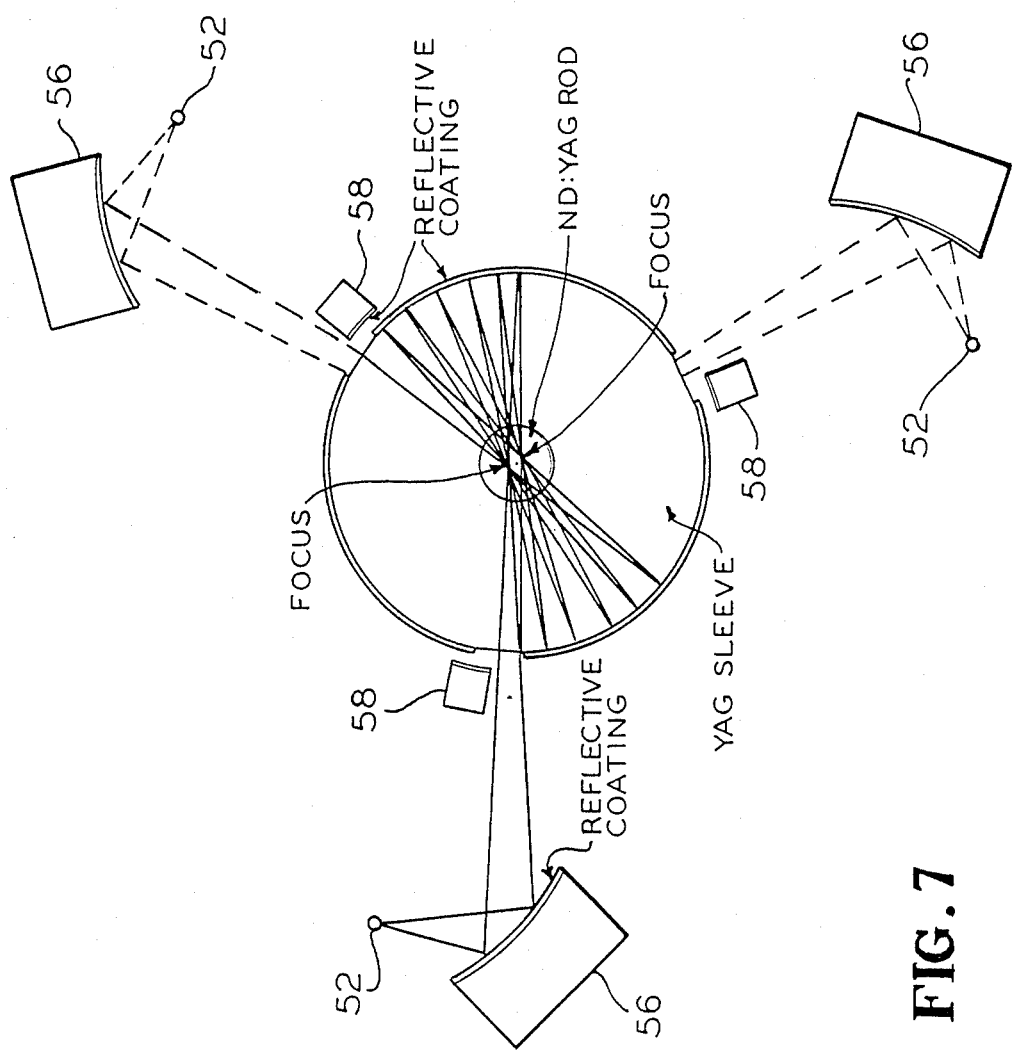
FIG. 7 is a cross-sectional view of an alternative embodiment utilizing externally mounted cylindrical retro-reflectors in addition to the off-set cylindrical reflectors as shown in FIG. 5.

An alternative embodiment is shown in FIG. 6 wherein an offset cylindrical reflector 56 is used to focus the light from the laser diode array source 52 instead of the refractive focus lens 48 shown in the first embodiment. A further modification is shown in FIG. 6 in which an externally mounted cylindrical retro-reflective lens 58 is used in place of the retro-reflective lens element 50 of the first embodiment. Functionally, these second and third alternative embodiments operate exactly as does the first embodiment, the only difference being in the choice of optics utilized to focus the laser light from the source, and to reflect the focused light back through its original path.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a side pumped laser comprising a cylindrical laser rod, a cylindrical sleeve surrounding the laser rod, the sleeve having an aperture, an optical pump source aligned with the sleeve aperture and oriented to impart energy therethrough and into the rod, at least a portion of the outer sleeve wall having at least one means to reflect the optical pump energy, the improvement comprising means to direct energy from the optical pump source along a plurality of different paths through the rod to form at least one focal point of energy concentration within said rod wherat more than two of said plurality of paths substantially intersect each other, wherein the directing means includes a first means to initially focus the pump energy through the rod in an off-center path so that the energy alternately reflects from the outer sleeve wall at points successively further from the pump source, the focal points thereby being off-axis.

2. The device of claim 1 wherein the directing means includes a second focus means spaced apart from the first focus means, said second focus means having means to reflect pump energy through the rod in an off-center path so that the energy alternately reflects from the outer sleeve wall at points successively further from the second focus means and closer to the first focus means.

3. The device of claim 1 wherein a plurality of pump sources are spaced about the periphery of the sleeve, each of said pump sources having an associated directing means.

4. The device of claim 3 wherein the sleeve has an aperture substantially with each pump source, at least a portion of the balance of the outer wall of the sleeve having means to reflect the pump energy, and wherein each directing means includes means to reflect pump energy from its associated pump through the rod from more than one point around the circumference of the sleeve wall.

5. The device of claim 4 wherein each directing means includes a first means to initially focus the pump energy from its associated pump through the rod in an off-center path so that the energy alternately reflects from the outer sleeve wall at points successively further from the pump source.

6. The device of claim 5 wherein each directing means includes a second focus means spaced apart from the first focus means, said second focus means having means to reflect pump energy from its associated pump through the rod in an off-center path so that the energy alternately reflects from the outer sleeve wall at points successively further from the second focus means and closer to the first focus means.

7. The device of claim 6 wherein the second focus means of each associated pump is substantially adjacent the first focus means of an adjacent pump so that pump energy is reflected from points along substantially the entire outer wall of the sleeve.

8. The device of claim 7 wherein the first focus means and its adjacent focus means is aligned with the associated pump source aperture.

9. The device of claim 8 wherein the sleeve is hollow, and further comprising means to circulate fluid therethrough.

10. The device of claim 8 wherein the sleeve is optically transparent, and further comprising a reflective coating surrounding a substantial portion of the exterior surface of the sleeve.

11. The device of claim 10 wherein the apertures are the only exterior sleeve surfaces not coated with the reflective coating.

12. The device of claim 8 wherein the pump sources are symmetrically positioned about the exterior sleeve surface.

13. The device of claim 12 wherein three pump sources are positioned about the sleeve.

14. The device of claim 8 wherein each pump source comprises a linear laser diode array.

15. In a side pumped laser comprising a cylindrical laser rod and a line optical pump source coupled to the side of the rod, the improvement comprising means to focus the energy from the optical pump source at a plurality of points which are off the lognitudinal axis of the rod by reflecting the energy through the rod a plurality of times along a plurality of paths, each of said paths substantially intersecting at least at one of said focused energy points and each point being comprised of more than two intersecting paths.

16. The laser of claim 15 wherein the focusing means has means to direct substantially half of said plurality of paths to substantially intersect at a first focused energy point and the other half of said plurality of paths to substantially intersect at a second focused energy point.

17. The laser of claim 16 further comprising a plurality of line optical pump sources coupled to the side of the rod, each pump source having an associated energy focusing means.

18. The laser of claim 16 wherein said focusing means comprises a sleeve surrounding said laser, said sleeve having a reflecting coating thereon about less than all of its periphery, the non-coated portion of the sleeve forming an aperture for said pump source, and a lens positioned at said aperture through which energy from the pump source passes and is focused.

19. The laser of claim 16 wherein said focusing means further coprises a second lens positioned at said aperture for reflecting energy impinging thereon back along its incident path.

20. A side pumped laser comprising a generally cylindrical laser rod, a generally cylindrical sleeve surrounding the laser rod, the sleeve being substantially optically transparent, a substantially reflective surface formed around the periphery of the sleeve, a plurality of substantially longitudinally aligned apertures through the reflective surface spaced about the periphery of the sleeve, each aperture having an associated pump source, and means to reflect the pump energy from each pump back and forth through the rod a plurality of times to form at least two focal points in said rod wherein said reflected energy is concentrated, said focal points being characterized by a substantial intersection of at least three energy reflections.

21. The laser of claim 20 wherein the reflection means includes means to substantially confine the reflection of pump energy from each pump source to a pre-determined associated portion of the laser rod.

22. The laser of claim 19 wherein the rod portions are at different angular positions in the rod.

23. The laser of claim 22 wherein the portions are substantially non-overlapping.

24. The laser of claim 21 wherein the reflection means comprises a first focus means substantially aligned with each aperture and pump source, and wherein the reflection confining means comprises a second focus means having means to re-direct the pump energy back along its intial path.

25. The laser of claim 24 wherein each first focus means has means to direct pump energy from its associated pump source through an off axis portion of the laser rod so that subsequent alternate reflections from the adjacent arc of reflective surface are further away from the pump source, said focal points thereby being off axis.

26. The laser of claim 25 wherein each second focus means has means to reflect pump energy from its associated pump source through an off axis portion of the laser rod so that subsequent alternate reflections from the adjacent arc of reflective surface are further away from the second focus means and closer to its associated aperture.

27. The laser of claim 26 wherein each pump source is a line optical pump source.

28. The laser of claim 27 wherein at least three pump sources are symmetrically spaced about the sleeve.

29. The laser of claim 28 wherein each pump source is a linear laser diode array.

30. The laser of claim 21 wherein the reflection means comprises a first focus means substantially aligned with each aperture, the pump source being offset from said first focus means, and wherein the reflection confining means comprises a second focus means, the second focus means having means to redirect the pump energy back along its initial path.

31. The laser of claim 30 wherein the second focus means comprises an externally mounted cylindrical retro-reflective lens.

32. The laser of claim 31 wherein each first focus means has means to direct pump energy from its associated pump source through an off axis portion of the laser rod so that subsequent alternate reflections from the adjacent arc of reflective surface are further away from the pump source.

33. The laser of claim 32 wherein each second focus means has means to reflect pump energy from its associated pump source through an off axis portion of the laser rod so that subsequent alternate reflections from the adajcent arc of reflective surface are further away from the second focus means and closer to its associated aperture.

34. A method of concentrating the pump energy within a laser rod comprising the steps of:
surrounding the laser rod with a cylindrical sleeve, the sleeve having means about its periphery to reflect pump energy and at least one aperture for transmitting pump energy into said rod,
side pumping the laser through the aperture,
reflecting the pump energy from the periphery of the sleeve along a plurality of different paths through the rod, and
focusing at least three of said different paths to substantially intersect within the rod to thereby form concentrated areas of pump energy.

35. The method of claim 34 wherein the step of focusing further comprises the step of directing substantially half of said different paths to substantially intersect at one location and the other half of said different paths to substantially intersect at anohter location, both of said locations being off of the longitudinal axis of the rod.

36. The method of claim 35 wherein the step of reflecting the pump energy includes the step of alternately reflecting energy from points along the periphery successively further from the aperture.

37. The method of claim 36 wherein the step of reflecting the pump energy includes the step of alternately reflecting energy from points along the periphery successively closer to the aperture.

* * * * *